(12) United States Patent
Cho et al.

(10) Patent No.: US 8,153,549 B2
(45) Date of Patent: Apr. 10, 2012

(54) CATALYST FOR TREATING EXHAUST GAS AND DEVICE FOR TREATING EXHAUST GAS USING THE SAME

(75) Inventors: Jin Cho, Tochigi (JP); Kenji Tanikawa, Tochigi (JP)

(73) Assignee: Johnson Matthey Public Limited Company, London (GB)

( * ) Notice: Subject to any disclaimer, the term of this patent is extended or adjusted under 35 U.S.C. 154(b) by 828 days.

(21) Appl. No.: 11/665,475

(22) PCT Filed: Nov. 1, 2004

(86) PCT No.: PCT/JP2004/016230
§ 371 (c)(1),
(2), (4) Date: Apr. 3, 2008

(87) PCT Pub. No.: WO2006/040842
PCT Pub. Date: Apr. 20, 2006

(65) Prior Publication Data
US 2009/0044521 A1     Feb. 19, 2009

(30) Foreign Application Priority Data

Oct. 15, 2004   (JP) .................................. 2004-301597

(51) Int. Cl.
*B01J 23/00* (2006.01)
*B01J 21/00* (2006.01)
*B01J 20/00* (2006.01)

(52) U.S. Cl. .............. 502/327; 502/66; 502/74; 502/87; 502/300; 502/302; 502/303; 502/304; 502/326; 502/332; 502/333; 502/334; 502/339; 502/349; 502/350; 502/355; 502/415; 502/439; 502/527.12; 502/527.13

(58) Field of Classification Search .............. 502/60–87, 502/300, 304, 326, 327, 332–334, 339, 349, 502/350, 355, 415, 439, 527.12, 527.13
See application file for complete search history.

(56) References Cited

U.S. PATENT DOCUMENTS

| | | | | |
|---|---|---|---|---|
| 3,939,104 A | * | 2/1976 | Campbell et al. | 502/245 |
| 4,027,476 A | * | 6/1977 | Schmidt | 60/218 |
| 4,426,320 A | * | 1/1984 | Ernest et al. | 502/313 |
| 4,793,980 A | * | 12/1988 | Torobin | 423/213.5 |
| 5,175,136 A | * | 12/1992 | Felthouse | 502/242 |

(Continued)

FOREIGN PATENT DOCUMENTS

EP        1 364 706 A1    11/2003

(Continued)

OTHER PUBLICATIONS

Office Action mailed Dec. 23, 2010 in U.S. Appl. No. 12/295,811.

*Primary Examiner* — Cam N. Nguyen
(74) *Attorney, Agent, or Firm* — Ratner Prestia; Kevin M. Carroll

(57) ABSTRACT

A catalyst for treating an exhaust gas has at least a carrier and plural layers formed on the carrier, wherein at least one layer of the above plural layers has an interstice in the layer, and at least one layer of the above plural layers contains a catalyst component. The above catalyst for treating an exhaust gas allows the enhancement of the diffusion of an exhaust gas in a catalyst layer, which results in the improvement of catalyst efficiency.

23 Claims, 2 Drawing Sheets

U.S. PATENT DOCUMENTS

| | | | |
|---|---|---|---|
| 5,354,720 A * | 10/1994 | Leyrer et al. | 502/64 |
| 5,702,675 A | 12/1997 | Takeshima et al. | |
| 6,831,036 B1 | 12/2004 | Yamazaki et al. | |
| 6,858,563 B2 * | 2/2005 | Suzawa et al. | 502/439 |
| 6,887,826 B2 * | 5/2005 | Nishimura et al. | 501/118 |
| 6,916,450 B2 * | 7/2005 | Akama et al. | 422/180 |
| 6,936,561 B2 * | 8/2005 | Marques et al. | 502/64 |
| 6,953,769 B2 * | 10/2005 | Yamada et al. | 502/302 |
| 6,956,008 B2 | 10/2005 | Takeshima et al. | |
| 7,048,894 B2 * | 5/2006 | Tanaka et al. | 422/177 |
| 7,055,314 B2 * | 6/2006 | Treiber | 60/297 |
| 7,179,430 B1 * | 2/2007 | Stobbe et al. | 422/180 |
| 7,214,643 B2 * | 5/2007 | Yamamoto et al. | 502/300 |
| 7,306,771 B2 * | 12/2007 | Okawara | 422/177 |
| 7,547,656 B2 * | 6/2009 | Miura | 502/327 |
| 7,550,117 B2 * | 6/2009 | Alward et al. | 422/177 |
| 7,572,311 B2 * | 8/2009 | Zuberi | 55/523 |
| 7,625,529 B2 * | 12/2009 | Ohno et al. | 422/180 |
| 7,718,143 B2 * | 5/2010 | Ogura | 422/180 |
| 2001/0042440 A1 * | 11/2001 | Miyazawa et al. | 95/139 |
| 2003/0176280 A1 * | 9/2003 | Caze et al. | 502/439 |
| 2004/0072010 A1 * | 4/2004 | Date et al. | 428/566 |
| 2005/0107244 A1 * | 5/2005 | Ichikawa et al. | 502/60 |
| 2005/0191199 A1 * | 9/2005 | Date et al. | 419/2 |
| 2006/0261004 A1 * | 11/2006 | Lockledge et al. | 210/502.1 |
| 2009/0044521 A1 | 2/2009 | Cho et al. | |

FOREIGN PATENT DOCUMENTS

| | | |
|---|---|---|
| EP | 1 832 344 A1 | 9/2007 |
| JP | 92-215922 | 8/1977 |
| JP | 57-68143 | 4/1982 |
| JP | 8-168675 | 7/1996 |
| JP | 10-286462 A | 10/1998 |
| JP | 2000-42368 A | 2/2000 |
| JP | 2000-271480 A | 10/2000 |
| JP | 2001-079392 A | 3/2001 |
| JP | 2002-191988 | 7/2002 |
| JP | 2002-191988 A | 7/2002 |
| JP | 2002-253968 | 9/2002 |
| JP | 2003-326170 | 11/2003 |
| JP | 2004-33933 | 2/2004 |
| JP | 2004-330025 | 11/2004 |
| JP | 2006-410485 A | 4/2006 |
| WO | WO-2007/116881 A1 | 10/2007 |

* cited by examiner

[see also International Search Report: bilingual, English and Japanese]

CATALYST FOR TREATING EXHAUST GAS AND DEVICE FOR TREATING EXHAUST GAS USING THE SAME

This application is the U.S. National Phase application of PCT International Application No. PCT/JP2004/016230, filed Nov. 1, 2004, and claims priority of Japanese Patent Application No. 2004-301597, filed Oct. 15, 2004.

FIELD OF ART

The invention relates to an exhaust gas catalyst wherein a plurality of layers has been formed on a support.

BACKGROUND ART

The following may be listed as specific examples of exhaust gas catalysts for internal combustion engines and automotive engines in particular: oxidation catalysts for simultaneously treating hydrocarbon (HC) and carbon monoxide (CO) in exhaust gas; three-way catalysts for simultaneously treating the hydrocarbon, carbon monoxide and nitrogen oxides (NOx) in exhaust gas; NOx occlusion-reduction catalysts, wherein NOx is occluded from the exhaust gas at lean air-fuel ratio, the air-fuel ratio is switched to the theoretical air-fuel ratio or a rich air-fuel ratio before the occluded NOx reaches saturation, and the NOx is thereby reduced; and NOx selective reduction catalysts that reduce the NOx in the exhaust gas by means of a reducing agent.

Oxidation catalysts, three-way catalysts, NOx occlusion-reduction catalysts and NOx selective reduction catalysts are manufactured by making the catalyst components into a slurry, soaking onto a support such as a ceramic support of honeycomb geometry and calcining.

In nearly all existing exhaust gas catalysts, however, the catalyst components are formed uniformly on the support; gas diffusion in the exhaust gas is therefore slow when the exhaust gas flows into the exhaust gas catalyst, and as a result the exhaust gas is often found to be incompletely treated.

In view of this, Japan Patent Kokai No. 2002-191988 (Patent Reference 1) and Japan Patent Kokai No. 2002-253968 (Patent Reference 2) have proposed an NOx occlusion-reduction catalyst wherein the gas diffusibility of the exhaust gas is raised and the NOx cleaning efficiency is enhanced by supporting a noble metal and NOx occluding agent in a coating layer comprising a porous structure provided with pores of a specified size. However, there remains a need to raise the gas diffusibility of exhaust gas in the layer of catalyst components in exhaust gas catalysts to improve the efficiency of treatment of the exhaust gas.

Patent reference 1: Japan Patent Kokai No. 2002-191988
Patent Reference 2: Japan Patent Kokai No. 2002-253968

SUMMARY OF THE INVENTION

In devising the invention, the inventors discovered the constitution of an exhaust gas catalyst that improved the treatment of exhaust gas. In particular, they found that the treatment of exhaust gas could be improved by means of a catalyst formed from a plurality of layers wherein at least one of the plurality of layers contained voids of specified minor axis and diameter and comprised catalyst components. The invention is accordingly based on these findings. The invention aims thereby to provide an exhaust gas catalyst that raises the gas diffusibility of the exhaust gas, enabling treatment of the exhaust gas to be improved.

Accordingly, the exhaust gas catalyst claimed for the invention is an exhaust gas catalyst wherein at least are provided a support and a plurality of layers formed on the support, at least one of the aforesaid plurality of layers containing voids therewithin, and at least one of the aforesaid plurality of layers comprising catalyst components.

DETAILED DESCRIPTION OF THE INVENTION

Exhaust Gas Catalyst

The inventive exhaust gas catalyst is constituted as a catalyst wherein at least one of a plurality of layers contains voids therewithin. In the invention, at least one of the plurality of layers comprises catalyst components. "Void" herein signifies that a space exists in the layer; specific examples thereof may be listed as a cavity, a pore, or a narrow elongated pore in tunnel (cylindrical and/or prismatic) form.

According to a preferred embodiment of the invention, it is preferred that at least one of the aforesaid plurality of layers comprising the aforesaid catalyst components in the inventive exhaust gas catalyst contains voids therewithin. According to a more preferred embodiment, it is preferred that the mean diameter of the aforesaid voids in the inventive exhaust gas catalyst is riot less than 0.2 μm and not more than 500 μm.

1. EMBODIMENTS

Figure 1:
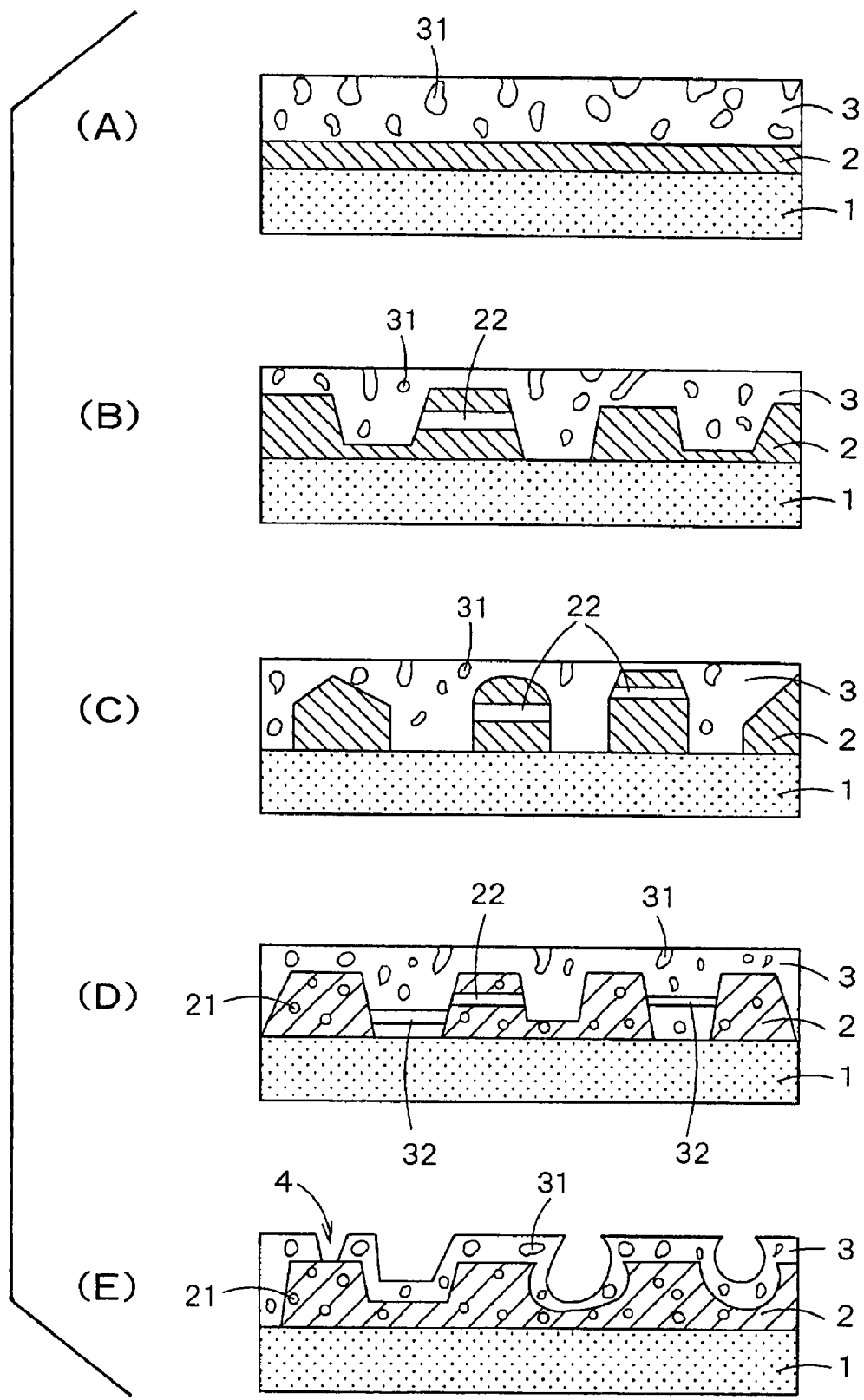
FIGS. 1(A)-(E) are outline drawings of the inventive exhaust gas catalyst.

Embodiments of the inventive exhaust gas catalyst will be explained with FIG. 1. FIGS. 1(A)-(E) each show a sectional view of an embodiment of the inventive exhaust gas catalyst. FIG. 1(A) shows an exhaust gas catalyst wherein a first layer 2 has been formed on a support 1 and a second layer 3 containing cavities 31 has been formed thereon. (B) shows an exhaust gas catalyst wherein a first layer 2 containing through-channels 22 has been formed in corrugated fashion on a support 1, and a second layer 3 containing cavities 31 has been formed thereon. (C) shows an exhaust gas catalyst wherein a first layer 2 containing through-channels 22 has been formed in sea-island fashion on a support 1 and a second layer 3 containing cavities 31 has been formed thereon. (D) shows an exhaust gas catalyst wherein a first layer 2 containing cavities 21 and through-channels 22 has been formed in corrugated and sea-island fashion on a support 1 and a second layer 3 containing cavities 31 and through-channels 32 has been formed thereon. (E) shows an exhaust gas catalyst wherein a first layer 2 containing cavities 21 has been formed in corrugated fashion on a support 1 and a second layer 3 containing cavities 31 has been formed thereon. In the latter exhaust gas catalyst, the first layer 2 is in places incompletely covered by the second layer 3, as shown by 4 in FIG. 1(E).

As shown in FIGS. 1(A)-(E), the first layer 2 and second layer 3 of the exhaust gas catalyst are mutually adjacent and contain cavities (21 or 31) or through-channels (22 or 32) as voids therein. The first layer 2 and second layer 3 may have the same or different mean porosities. Effective treatment of the exhaust is possible with such exhaust gas catalysts because the gas diffusivity of the exhaust gas is enhanced and the area of contact with exhaust gas is enlarged.

At least one or both of the above first layer 2 and second layer 3 comprises catalyst components. The cavities or through-channels in the first layer 2 and second layer 3 are only examples of voids in the respective layers; the invention is not restricted to these geometries.

2. Mean Diameter of Voids

According to the preferred embodiment of the invention, the mean diameter of the voids in at least one of the plurality of layers is not less than 0.2 μm and not more than 500 μm, preferably with a lower limit of not less than 0.5 μm and upper limit of not more than 300 μm. "Mean diameter" herein means four times the cross-sectional area of the voids, with reference to the maximum cross-sectional area, divided by the total perimeter on the cross-section. Where voids are present in at least one of the plurality of layers in the invention, the mean porosity of the voids is not less than 5% and not more than 80%, preferably with an upper limit of not more than 60% and preferably with a lower limit of not less than 10%.

According to a preferred embodiment of the invention, although the plurality of layers may be formed in any geometry, they are preferably formed in corrugated fashion. According to another preferred embodiment of the invention, at least one of the plurality of layers is formed on the support in sea-island fashion. These geometries may be formed physically when the plurality of layers is formed on the support, and are preferably formed by adjusting the geometry and amount of the forming agent as appropriate.

The thickness of the individual layers in the plurality of layers is not less than 1 μm and not more than 300 μm, preferably with an upper limit of not more than 280 μm, preferably not more than 250 μm, and a lower limit of not less than 2 μm, preferably not less than 5 μm.

The following may be listed as a specific example of means of forming the plurality of layers on the support. A powder of porous structure, if necessary the catalyst components (if a catalyst layer is to be formed), and the forming agent, are added to a solvent (for instance water) and agitated to prepare a slurry. The slurry is deposited on the support and calcined, forming layer one on the support. Another slurry is then deposited on the layer that has been formed and calcined to form another layer on the said layer one by the aforesaid procedure. The inventive exhaust gas catalyst is prepared by repetition of this procedure.

The forming agent is preferably an agent that burns off when calcined or dried and imparts none of its chemical characteristics on the exhaust gas catalyst. The forming agent is preferably a pyrolysable or combustible material of spherical, cylindrical, etc, form. Specific examples thereof may be listed as bloating agents, surfactants, expanding synthetic resins, active carbon, graphite powder, pulp powder, organic fibre and plastic fibre. Specific examples of the bloating agents may be listed as $La_2(CO_3)_3$, $Al_2(CO_3)_3$ and $Ce_2(CO_3)_3$, which preferably contain the same elements as the catalyst components. Specific examples of the surfactants may be listed as anionic surfactants such as sulphonate and carboxylate surfactants, cationic surfactants such as amine surfactants, and amphoteric surfactants such as fatty acid ester surfactants. Specific examples of the expanding synthetic resins may be listed as polyurethane, polystyrene, polyethylene, polyester and acrylic synthetic resins. The voids may be formed by the bloating agent alone, or may be formed by apparatus capable of generating cells (e.g. microbubbles) of uniform size.

The amount of forming agent added is not less than 5 wt % and not more than 80 wt % of the total weight of the components in each of the plurality of layers, preferably with an upper limit of not more than 70 wt %, preferably not more than 60 wt %, and a lower limit of not less than 5 wt %, preferably not less than 8 wt %.

Specific examples of the powder of porous structure may be listed as aluminium oxide, cerium oxide, titanium oxide, zirconium oxide and crystalline zeolite. When at least one of the plurality of layers comprises catalyst components, the catalyst components can be chosen as appropriate to the components of the exhaust gas, though according to a preferred embodiment of the invention, the catalyst components preferably comprise those of a three-way catalyst, oxidation catalyst, NOx occlusion-reduction catalyst or NOx selective reduction catalyst. The respective catalyst layers of a plurality of catalyst layers may comprise the same or different catalyst components.

Specific examples of the support may be listed as supports in pellet form (granular) consisting of alumina, or supports in monolithic form (honeycomb) consisting of cordierite ceramic or a metal such as stainless steel. Especially preferred are supports in monolithic form that have outstanding heat-resistance, thermal shock resistance and mechanical strength.

Utilisation of Exhaust Gas Catalyst

The inventive exhaust gas catalyst may be constituted as follows, consistent with application to exhaust gas treatment.

(1) Three-Way Catalyst

According to another embodiment the invention provides a three-way catalyst, in which case at least one of the plurality of layers contains an active metal as three-way catalyst component, and if necessary a catalyst promoter.

Active Metal

A noble metal may be cited as the active metal; platinum, palladium and rhodium may be listed as specific examples of the noble metal, which is preferably chosen from the group comprising platinum, palladium, rhodium and mixtures thereof. The amounts of active metal added are not less than 0.001 wt % and not more than 20 wt % of the total amount of three-way catalyst component, with an upper limit of preferably not more than 5 wt % and a lower limit of not less than 0.002 wt %, preferably not less than 0.005 wt %.

Catalyst Promoter

Specific examples of the catalyst promoter may be listed as promoters chosen from the group comprising aluminium oxide, cerium oxide, zirconium oxide, scandium oxide, yttrium oxide, lanthanum oxide, neodymium oxide, praseodymium oxide, zeolite and composite oxides thereof.

(2) Oxidation Catalyst

According to another embodiment the invention provides an oxidation catalyst, in which case at least one of the plurality of layers comprises an active metal as oxidation catalyst component, and if necessary a catalyst promoter.

Active Metal

A noble metal may be cited as the active metal. Platinum, palladium and rhodium may be listed as specific examples of the noble metal, which is preferably chosen from the group comprising platinum, palladium, rhodium and mixtures thereof.

The amount of active metal added is not less than 0.001 wt %, and not more than 30 wt %, of the total amount of the oxidation catalyst components, preferably with an upper limit of not more than 25 wt % and preferably with a lower limit of not less than 0.002 wt %.

Catalyst Promoter

Specific examples of the catalyst promoter may be listed as aluminium oxide, cerium oxide, zirconium oxide and zeolite.

(3) NOx Occlusion-Reduction Catalyst

According to another embodiment the invention provides an NOx occlusion type catalyst, in which case at least one of the plurality of layers comprises NOx occlusive agent, active metal, and if necessary a catalyst promoter as NOx occlusion type catalyst components.

NOx Occlusive Agent

As specific examples of the NOx occlusive agent may be cited agents chosen from the group comprising alkali metals, alkaline earth metals, rare earth metals and mixtures thereof.

As specific examples of alkali metals may be listed alkali metals chosen from the group comprising lithium, sodium, potassium, rubidium, caesium, francium and mixtures thereof.

As specific examples of alkaline earth metals may be listed alkaline earth metals chosen from the group comprising beryllium, magnesium, calcium, strontium, barium and mixtures thereof.

As specific examples of the rare earth metals may be listed scandium, yttrium, lanthanum, cerium, praseodymium, neodymium and mixtures thereof.

The NOx occlusive agent can if necessary comprise a base metal, specific examples whereof may be listed as nickel, copper, manganese, iron, cobalt and zinc.

The amount of NOx occlusive agent added is not less than 1 wt % and not more than 80 wt % of the total amount of the NOx occlusion-reduction catalyst components, preferably with an upper limit of not more than 75 wt %, preferably not more than 70 wt %, and a lower limit of not less than 2 wt %, preferably not less than 5 wt %.

Active Metal

Noble metals and base metals may be listed as specific examples of the active metal. As specific examples of the noble metals may be cited metals chosen from the group comprising platinum, palladium, rhodium, ruthenium, iridium, osmium, gold, silver and mixtures thereof, whereof platinum, palladium, rhodium and mixtures thereof are preferred.

As specific examples of the base metals may be listed nickel, copper, manganese, iron, cobalt, tungsten, molybdenum, zinc and mixtures thereof.

The amount of active metal added is more than 0 wt % and not more than 50 wt % of the total amount of NOx occlusion-reduction catalyst components, preferably with an upper limit of not more than 45 wt %, preferably not more than 40 wt %.

Catalyst Promoter

As specific examples of the catalyst promoter may be listed promoters chosen from the group comprising aluminium oxide, cerium oxide, zirconium oxide, titanium oxide, silica and their composite oxides. The amount of catalyst promoter added is more than 5 wt % and not more than 95 wt % with respect to the total amount of NOx occlusion reduction catalyst components, preferably with an upper limit of not more than 90 wt %, preferably not more than 60 wt %.

(4) NOx Selective Reduction Catalyst

According to another embodiment, the invention provides an NOx selective reduction catalyst, in which case at least one of the plurality of layers comprises active metal and catalyst promoter as NOx selective reduction catalyst.

Active Metal

Specific examples of the active metal may be listed as metals chosen from the group comprising noble metals, transition metals, rare earth metals, mixtures thereof and oxides thereof; the active metal is preferably chosen from the group comprising platinum, gold, copper, vanadium, tungsten, titanium and oxides thereof.

The amount of active metal added is not less than 0.001 wt % and not more than 20 wt % of the total amount of the NOx occlusion[sic]-reduction catalyst components, preferably with an upper limit of not more than 15 wt %, preferably not more than 10 wt %, and a lower limit of not less than 0.002 wt %, preferably not less than 0.005 wt %.

Catalyst Promoter

As catalyst promoters may be listed promoters chosen from the group comprising aluminium oxide, cerium oxide, zirconium oxide, titanium oxide, silica, zeolite and their composite oxides. The amount of catalyst promoter added is more than 1 wt % and not more than 50 wt % of the total amount of the NOx selective reduction catalyst components, preferably with an upper limit of not more than 45 wt %, preferably not more than 40 wt %.

Reducing Agent

NOx selective reduction catalysts utilise a reducing agent for treating the nitrogen oxides in exhaust gas. Specific examples of the reducing agent may be listed as ammonia or amines, urea or its derivatives, hydrazine or its derivatives, triazine or its derivatives, hydrocarbons, or organic compounds containing oxygen atoms.

Specific examples of the amines are amines of 1-5 carbon atoms, preferably methylamine. Guanidine and biuret are preferably listed as specific examples of the urea derivatives. Cyanuric acid is preferably listed as a specific example of the hydrazine derivatives. Specific examples of the hydrocarbons are gas oil, kerosene or $C_3$-$C_8$ paraffins. Specific examples of the organic compounds containing oxygen atoms are alcohols (preferably alcohols of 1-5 carbon atoms, more preferably methanol and ethanol), ketones, ethers, organic carboxylic acids, fatty acids and esters.

Exhaust Gas Treatment Apparatus

Figure 2:
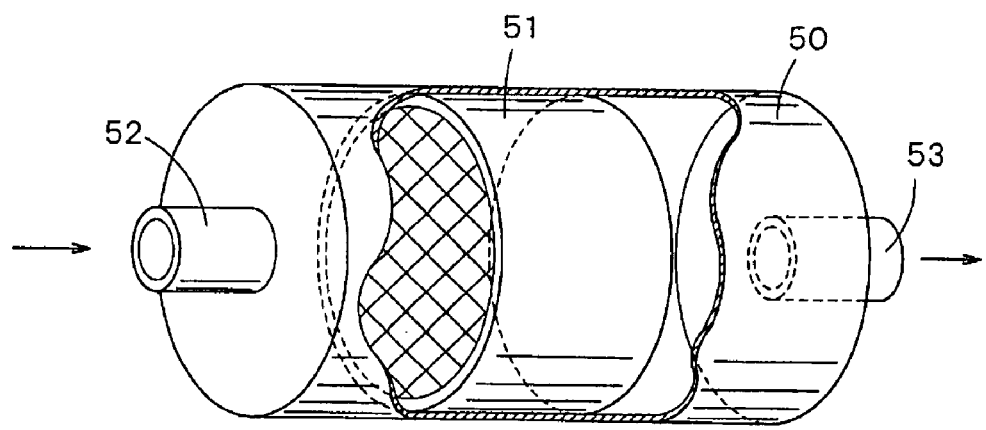
FIG. 2 is an outline drawing of the inventive apparatus for treating exhaust gas.

According to another embodiment, the invention provides exhaust gas treatment apparatus equipped with the inventive exhaust gas catalyst. The scope of the inventive exhaust gas treatment apparatus will be explained with the aid of FIG. 2. FIG. 2 is an outline diagram of exhaust gas treatment apparatus equipped with the inventive exhaust gas catalyst. The inventive exhaust gas treatment apparatus 50 consists of an assembly provided with an exhaust gas inlet 52 and exhaust gas exit 53, wherein is provided the inventive exhaust gas catalyst 51. The exhaust gas enters at the inlet 52, at least one of the hydrocarbon, carbon monoxide and nitrogen oxide components of the exhaust gas is treated in the inventive exhaust gas catalyst 51, and the treated exhaust gas is discharged via the exit 53.

If, according to a preferred embodiment of the invention, the exhaust gas catalyst 51 in FIG. 2 is a three-way catalyst of the invention, the hydrocarbon, the carbon monoxide and the nitrogen oxides in the exhaust gas are treated with the exhaust gas catalyst (three-way catalyst) and converted to water, carbon dioxide and nitrogen. If, according to another preferred embodiment of the invention, the exhaust gas catalyst 51 in FIG. 2 is an oxidation catalyst of the invention, the hydrocarbon and carbon monoxide in the exhaust gas are treated with the exhaust gas catalyst (oxidation catalyst) and converted to water and carbon dioxide. If, according to another preferred embodiment of the invention, the exhaust gas catalyst 51 in FIG. 2 is an NOx occlusion-reduction catalyst of the invention, the nitrogen oxides in the exhaust gas are treated with the exhaust gas catalyst (NOx occlusion-reduction catalyst) and converted to water and nitrogen. If the exhaust gas catalyst 51 in FIG. 2 is an NOx selective reduction catalyst of the invention, the nitrogen oxides in the exhaust gas are treated by the exhaust gas catalyst (NOx selective reduction catalyst) together with reducing agent and converted to water and nitrogen; wherein the reducing agent is admitted from a reducing agent inlet located in front of the exhaust gas catalyst 51.

Application of the Exhaust Gas Catalyst

The inventive exhaust gas catalyst is used to clean up exhaust gas. The inventive exhaust gas catalyst and the apparatus using it are used in the exhaust systems of internal combustion engines, particularly spark-ignition engines (for example petrol engines) and compression-ignition engines (for example diesel engines). The said engines may be engines burning fuel with adjustment of the air-fuel ratio, whereof preferred specific examples may be listed as lean burn engines, direct injection engines, and preferably a combination of these (i.e. direct injection lean burn engines). A direct injection engine employs a fuel delivery system capable of delivering a higher compression ratio, enhanced combustion efficiency and lower exhaust emission. Combined with a lean burn engine, therefore, it is capable of further enhancing combustion efficiency and reducing exhaust emission.

The inventive exhaust gas catalyst is utilised in the exhaust gas systems of the internal combustion engines mounted in conveyances, machines, etc. Specific examples of the conveyances and machines may be listed as: means of transport, such as cars, buses, trucks, dumper cars, diesel railcars, motorbikes, motorised cycles, ships, tankers, motor boats and aircraft; agriculture and forestry machines such as cultivators, tractors, combine harvesters, chain saws and lumber conveyors; fisheries machines such as fishing vessels; civil engineering machines such as tank lorries, cranes, compressors and diggers; and power generators. In the case of vehicle exhaust systems, for example, the inventive exhaust gas catalyst can be installed as a starter catalyst, underfloor converter or manifold converter.

EXAMPLES

The content of the invention will be described in detail with working examples. However, the content of the invention is not to be construed as limited by the said examples.
Preparation of Exhaust Gas Catalyst Example 1

$\gamma$-$Al_2O_3$ powder 25 parts by weight, water 60 parts by weight and platinum nitrate solution were mixed and an acrylic resin [a resin of mean diameter ca. 30 μm to ca. 150 μm (on average ca. 60 μm) was used] was further mixed therewith as forming agent to constitute 10 wt % of the total. A slurry wherein the forming agent was uniformly dispersed was obtained by agitating for 30 min in an air atmosphere with a high speed mixer (Silverson Machines Inc.). A cordierite honeycomb substrate (volume 1000 cc, 600 cells/in$^2$: NGK Insulators Ltd.) was prepared, dipped in the aforesaid slurry, and withdrawn; after excess slurry had been blown off, the support was calcined for 1 hour at 500° C. in air to lay down a first layer.

$\gamma$-$Al_2O_3$ powder 5 parts by weight, water 20 parts by weight and rhodium nitrate solution were mixed and an acrylic resin [a resin of mean diameter ca. 0.5 μm to ca. 100 μm (on average ca. 20 μm) was used] was further mixed therewith as forming agent to constitute 20 wt % of the total; agitation for 30 min in an air atmosphere with the aforesaid high speed mixer gave a slurry wherein the forming agent was uniformly dispersed. The honeycomb substrate whereon the first layer had been formed was then dipped in the aforesaid slurry and withdrawn; after excess slurry had been blown off, the support was calcined for 1 hour at 500° C. in air to lay down a second layer, affording an exhaust gas catalyst (three-way catalyst).

The exhaust gas catalyst had a catalyst loading per liter of honeycomb substrate of Pt (platinum) 0.54 g and Rh (rhodium) 0.07 g.

Example 2

An exhaust gas catalyst was obtained as in Example 1 except that the second layer was formed without addition of forming agent.

Example 3

An exhaust gas catalyst was obtained as in Example 1 except that the first layer was formed without addition of forming agent.

COMPARATIVE EXAMPLE 1

An exhaust gas catalyst was obtained as in Example 1 except that the first layer and second layer were formed without addition of forming agent.
Evaluation Test 1

Specimens cut to diameter 25.4 mm, length 30 mm, from the catalysts of Examples 1-3 and Comparative Example 1 were respectively mounted in a test unit having an exhaust gas inlet and exit (Horiba Seisakusho Ltd.). Heat treatment was carried out for 20 min while the gas of rich composition and gas of lean composition shown in Table 1 were alternately admitted from the inlet of the test unit every 3 min at a gas temperature of 900° C. The gas of rich composition and gas of lean composition shown in Table 2 were then each admitted from the inlet of the unit at 1 Hz, whereupon the percentage NOx clean-up was measured. Measurements were made at gas temperatures of 280° C. and 300° C. The 5 minute mean clean-up (%) at each temperature is shown in Table 3. In Tables 1 and 2, (%) signifies volume percent.
[Table 1]

TABLE 1

|  | CO | $H_2$ | $O_2$ | $H_2O$ | $N_2$ |
|---|---|---|---|---|---|
| Rich | 3% | 3% |  | 10% | balance |
| Lean |  |  | 3% | 10% | balance |

[Table 2]

TABLE 2

|  | $C_3H_6$ (ppm) | $O_2$ (%) | NO (ppm) | CO (%) | $H_2$ (%) | $CO_2$ (%) | $H_2O$ (%) | $N_2$ |
|---|---|---|---|---|---|---|---|---|
| Rich | 400 | 0.50 | 500 | 2.11 | 0.70 | 14.0 | 10% | balance |
| Lean | 400 | 1.54 | 500 | 0.50 | 0.17 | 14.0 | 10% | balance |

[Table 3]

TABLE 3

|  | NOx clean-up (%) | |
|---|---|---|
|  | 280° C. | 300° C. |
| Working example 1 | 70.9 | 66.9 |
| Working example 2 | 70.0 | 66.0 |
| Working example 3 | 69.3 | 67.3 |
| Comparative example 1 | 68.2 | 64.1 |

Example 4

γ-$Al_2O_3$ powder 10 parts by weight, 15 parts by weight of a composite oxide of cerium oxide and zirconium oxide, water 77 parts by weight and platinum nitrate solution were mixed, and an acrylic resin [a resin of mean diameter ca. 30 μm to ca. 150 μm (on average ca. 60 μm) was used] was further mixed therewith as forming agent to constitute 14 wt % of the total. A slurry wherein the forming agent was uniformly dispersed was obtained by agitating for 30 min in an air atmosphere with a high speed mixer (Silverson Machines Inc.). A cordierite honeycomb substrate (volume 1000 cc, 600 cells/$in^2$: NGK Insulators Ltd.) was prepared, dipped in the aforesaid slurry, and withdrawn; after excess slurry had been blown off, the support was calcined in air for 1 hour at 500° C. to lay down a first layer.

γ-$Al_2O_3$ powder 5 parts by weight, 5 parts by weight of a composite oxide of cerium oxide and zirconium oxide, water 76 parts by weight and rhodium nitrate solution were mixed and an acrylic resin [a resin of mean diameter ca. 4 μm to ca. 7 μm (on average ca. 5 μm) was used] was further mixed therewith as forming agent to constitute 8 wt % of the total; agitation for 30 min in an air atmosphere with the aforesaid high speed mixer gave a slurry wherein the forming agent was uniformly dispersed. The honeycomb substrate whereon the first layer had been formed was then dipped in the slurry and withdrawn; after excess slurry had been blown off, the support was calcined for 1 hour at 500° C. in air to lay down a second layer, thus affording an exhaust gas catalyst (three-way catalyst).

The exhaust gas catalyst had a catalyst loading per liter of honeycomb substrate of Pt (platinum) 0.75 g and Rh (rhodium) 0.075 g.

COMPARATIVE EXAMPLE 2

An exhaust gas catalyst was obtained as in Example 4 except that the first layer and second layer were formed without addition of forming agent.
Evaluation Test 2

The catalysts for exhaust gas clean-up obtained in Example 4 and Comparative Example 2 were respectively accommodated in a catalyst canister, installed in the exhaust system of the 4000 cc displacement volume petrol engine, and left in place for 50 hours at a temperature in the catalyst bed of 900° C. while regular grade petrol fuel was burned under conditions of A/F variation=14.5 (steady-state).

The respective catalysts were then accommodated in cylinders of diameter 15 cm, length 40 cm, mounted in a petrol engine vehicle with a displacement volume of 2200 cc, regular grade petrol fuel was burned and performance was evaluated in FTP mode (a transient mode exhaust gas test). An evaluation unit of tradename "Mexa 9000" (Horiba Seisakusho Ltd.) was used. The evaluation results are recorded in Table 4 below, lower figures denoting a higher exhaust gas cleaning capacity.

TABLE 4

| Example/evaluation test 2 | | | |
| --- | --- | --- | --- |
| | THC | CO | NOx |
| Example 4 | 0.058 | 0.28 | 0.106 |
| Comparative Example 2 | 0.058 | 0.26 | 0.120 |

Example 5

γ-$Al_2O_3$ powder 16 parts by weight, 8 parts by weight of a composite oxide of cerium oxide and zirconium oxide, water 65 parts by weight and palladium nitrate solution were mixed, and an acrylic resin [a resin of mean diameter ca. 4 μm to ca. 7 μm (on average ca. 5 μm) was used] was further mixed therewith as forming agent to constitute 8 wt % of the total. A slurry wherein the forming agent was uniformly dispersed was obtained by agitating for 30 min in an air atmosphere with a high speed mixer (Silverson Machines Inc.). A cordierite honeycomb substrate (volume 635 cc, 600 cells/$in^2$: NGK Insulators Ltd.) was prepared, dipped in the aforesaid slurry, and withdrawn; after excess slurry had been blown off, the support was calcined in air for 1 hour at 500° C. to lay down a first layer.

γ-$Al_2O_3$ powder 6 parts by weight, 6 parts by weight of a composite oxide of cerium oxide and zirconium oxide, water 80 parts by weight and rhodium nitrate solution were mixed and an acrylic resin [a resin of mean diameter ca. 4 μm to ca. 7 μm (on average ca. 5 μm) was used] was further mixed therewith as forming agent to constitute 6 wt % of the total; agitation for 30 min in an air atmosphere with the aforesaid high speed mixer gave a slurry wherein the forming agent was uniformly dispersed. The honeycomb substrate whereon the first layer had been formed was then dipped in the slurry and withdrawn; after excess slurry had been blown off, the support was calcined for 1 hour at 500° C. in air to lay down a second layer, thus affording an exhaust gas catalyst (three-way catalyst).

The exhaust gas catalyst had a catalyst loading of Pd (palladium) 0.53 g and Rh (rhodium) 0.11 g per liter of honeycomb substrate.

COMPARATIVE EXAMPLE 3

An exhaust gas catalyst was obtained as in Example 5 except that the first layer and second layer were formed without the addition of forming agent.
Evaluation Test 3

The catalysts for exhaust gas clean-up obtained in Example 5 and Comparative Example 3 were respectively accommodated in a catalyst canister, installed in the exhaust system of a 4000 cc displacement volume petrol engine, and left in place for 8 hours at a temperature in the catalyst bed of 830° C. while regular grade petrol fuel was burned under conditions of A/F variation cycle 6 min (A/F=14.5 for 5.5 min, A/F=17 for 0.5 min).

The respective catalysts were then re-housed in canisters, mounted in a petrol engine vehicle with a displacement volume of 2000 cc, regular grade petrol fuel was burned and performance was evaluated in 11P mode (vehicle exhaust mode). An evaluation unit of tradename "Mexa 9000" (Horiba Seisakusho Ltd.) was used. The evaluation results are recorded in Table 5 below, lower figures denoting a higher exhaust gas cleaning capacity.

TABLE 5

| Example/evaluation test 3 | | | |
| --- | --- | --- | --- |
| | THC | CO | NOx |
| Example 4[sic] | 1.0 | 4.94 | 0.311 |
| Comparative Example 2[sic] | 1.0 | 5.06 | 0.377 |

The invention claimed is:

1. An exhaust gas catalyst comprising:
   a. a support;
   b. a first catalytic layer formed on the support, wherein the first catalytic layer has voids therewithin formed via a first forming agent; and
   c. a second catalytic layer formed on and adjacent to said first catalytic layer,
   wherein the second catalytic layer has voids therewithin formed via a second forming agent,
   provided that the mean diameter of the voids in each layer is not less than 0.2 µm and not more than 500 µm, and wherein the mean porosity of each layer derived from the voids is not less than 10% and not more than 80%.

2. The exhaust gas catalyst of claim 1 wherein said first and second catalytic layers independently have a thickness of not less than 1 µm and not more than 300 µm.

3. The exhaust gas catalyst of claim 1 wherein said first and second catalytic layers have a corrugated geometry.

4. The exhaust gas catalyst of claim 1 wherein said first and second catalytic layers have a sea-island geometry.

5. The exhaust gas catalyst of claim 1 wherein said voids comprise through-channels.

6. The exhaust gas catalyst of claim 1 wherein said voids comprise cavities.

7. The exhaust gas catalyst of claim 1 wherein said second catalytic layer incompletely covers said first catalytic layer.

8. The exhaust gas catalyst of claim 1 wherein said first and second catalytic layers have the same porosity.

9. The exhaust gas catalyst of claim 1 wherein said voids are formed by pyrolysis and/or combustion of said first and second forming agents.

10. The exhaust gas catalyst of claim 1 wherein said first and second forming agents are independently selected from the group consisting of bloating agents, surfactants, expanding synthetic resins, active carbon, graphite powder, pulp powder, organic fibre and plastic fibre.

11. The exhaust gas catalyst of claim 10 wherein said first and second forming agents are independently expanding synthetic resins.

12. The exhaust gas catalyst of claim 11 wherein said first and second forming agents are acrylic resin.

13. The exhaust gas catalyst of claim 12 wherein said first forming agent is acrylic resin particles having a first mean diameter and second forming agent is acrylic resin particles having a second mean diameter, wherein said first mean diameter is larger than said second mean diameter.

14. The exhaust gas catalyst of claim 1 wherein said first catalytic layer comprises a first porous catalytic material and said second catalytic layer comprises a second porous catalytic material.

15. The exhaust gas catalyst of claim 14 wherein said first and second porous catalytic materials are selected from the group consisting of aluminum oxide, cerium oxide, titanium oxide, zirconium oxide, crystalline zeolite, and mixtures thereof.

16. The exhaust gas catalyst of claim 15 wherein said first catalytic layer further comprises cerium and zirconium and said second catalytic layer further comprises cerium and zirconium.

17. An exhaust gas catalyst according to claim 1, wherein the catalyst components contained in at least one of the first and second catalytic layers comprise a catalyst selected from the group consisting of a three-way catalyst, an oxidation catalyst, a $NO_x$ occlusion-reduction catalyst and a $NO_x$ selective catalyst.

18. An exhaust gas catalyst according to claim 17, wherein the catalyst is the three-way catalyst and comprises a noble metal.

19. An exhaust gas catalyst according to claim 17, wherein the catalyst is the oxidation catalyst and comprises a noble metal.

20. An exhaust gas catalyst according to claim 17, wherein the catalyst is the $NO_x$ occlusion-reduction catalyst and comprises a catalyst component selected from the group consisting of alkali metals, alkaline earth metals, rare earth metals and mixtures of any two or more thereof.

21. An exhaust gas catalyst according to claim 17, wherein the catalyst is the $NO_x$ occlusion-reduction catalyst and comprises a noble metal or a base metal.

22. An exhaust gas catalyst according to claim 17, wherein the catalyst is the $NO_x$ selective-reduction catalyst and comprises a catalyst component selected from the group consisting of a platinum group metal, copper, vanadium, titanium, tungsten, oxides of any one or more thereof, and mixtures of any two or more thereof.

23. The exhaust gas catalyst of claim 1 wherein said first catalytic layer comprises platinum and alumina and said second layer comprises rhodium and alumina.

* * * * *

UNITED STATES PATENT AND TRADEMARK OFFICE
CERTIFICATE OF CORRECTION

PATENT NO. : 8,153,549 B2
APPLICATION NO. : 11/665475
DATED : April 10, 2012
INVENTOR(S) : Jin Cho et al.

Page 1 of 1

It is certified that error appears in the above-identified patent and that said Letters Patent is hereby corrected as shown below:

On the Title Page, Field (73) Assignee:

"Johnson Matthey Public Limited Company, London (GB)"

should read

-- Johnson Matthey Japan Incorporated, Tochigi (JP) --

Signed and Sealed this
Tenth Day of July, 2012

David J. Kappos
*Director of the United States Patent and Trademark Office*